US007657040B2

(12) United States Patent
Aiso et al.

(10) Patent No.: US 7,657,040 B2
(45) Date of Patent: Feb. 2, 2010

(54) PARAMETER SETTING APPARATUS FOR AUDIO MIXER, AND PROGRAM THEREFOR

(75) Inventors: Masaru Aiso, Hamamatsu (JP); Kotaro Terada, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1062 days.

(21) Appl. No.: 11/058,008

(22) Filed: Feb. 14, 2005

(65) Prior Publication Data

US 2005/0185805 A1 Aug. 25, 2005

(30) Foreign Application Priority Data

Feb. 20, 2004 (JP) ............................ 2004-045027

(51) Int. Cl.
*H04B 1/00* (2006.01)
*G06F 17/00* (2006.01)

(52) U.S. Cl. ........................................ 381/119; 700/94

(58) Field of Classification Search ................. 381/119; 700/79, 83, 94; 84/625, 660, 697
See application file for complete search history.

(56) References Cited

U.S. PATENT DOCUMENTS 5,402,501 A * 3/1995 Silfvajt et al. ............... 381/119
7,441,193 B1 * 10/2008 Wild et al. .................. 715/733

OTHER PUBLICATIONS

"PM1D Manager for Windows, Operating Manual", by Yamaha Corporation, 2002, Pro Audio & Digital Musical Instrument Division, Japan.

* cited by examiner

*Primary Examiner*—Vivian Chin
*Assistant Examiner*—Douglas J Suthers
(74) *Attorney, Agent, or Firm*—Morrison & Foerster LLP

(57) ABSTRACT

In an audio mixer, there are stored a plurality of scene data each including, as a set of data, respective settings of a plurality of types of parameters, and these scene data are displayed on a scene data list shown on a display section. Human operator selects a desired one of the scene data from the scene data list using an increment or decrement switch. Determination is made as to whether any object-of-caution data, such as patch data, is among the plurality of types of parameters included in the selected scene data, and, if so, a caution display window is displayed to caution the human operator about the object-of-caution data.

9 Claims, 3 Drawing Sheets

PARAMETER SETTING APPARATUS FOR AUDIO MIXER, AND PROGRAM THEREFOR

BACKGROUND OF THE INVENTION

The present invention relates generally to parameter setting apparatus for audio mixers, and more particularly to an improved parameter setting apparatus which has functions of storing a plurality of parameter setting data sets each including, as a set of data, respective settings of a plurality of types of parameters to be used in an audio mixer; and reading out any desired one of the stored parameter setting data sets to thereby collectively change current parameter settings of the mixer on the basis of the read-out parameter setting data set. The present invention also relates to a program for performing, in the audio mixer, the parameter setting changing functions based on the selected parameter setting data.

There have recently been known digital audio mixers, which are arranged to store respective setting states (i.e., settings or set values) of several types (or predetermined plurality of types) of parameters—such as preset setting states of the parameters or setting states of the parameters set by a human operator—, as a set of data (i.e., parameter setting data set) representing a "scene" and then reproduce the setting states of the individual parameters of the scene by reading out the thus-recorded setting state data of the parameters. In this specification, the set of data, representative of the scene or respective settings of the several types of parameters, will be referred to as "scene data". The human operator can store a plurality of such scene data (i.e., "scenes") and select any desired one of the stored scene data (parameter setting data sets) to read out the selected scene data. Thus, current settings of the parameters in the mixer can be collectively rewritten or changed in accordance with the contents of the read-out scene data. Further, in this specification, the term "store" is used to mean preserving setting states of given parameters as scene data, and the term "recall" is used to mean reading out the stored scene data to rewrite or change the current setting states of the given parameters in accordance with the contents of the read-out scene data.

To recall desired scene data, the human operator, for example, uses operators, provided on an operation panel of the body of the mixer, to select the desired scene data from among a plurality of currently-stored scene data and then give an instruction for recalling the selected scene data so that the current setting states of the predetermined parameters in the mixer can be changed on the basis of the contents of the read-out scene data.

Among examples of the conventionally-known digital audio mixers of the above-discussed type is a mixer (product name "PM1D") marketed by the assignee of the instant application. Operation or behavior of the entire mixer ("PM1D") can be controlled by a personal computer, externally connected to the mixer, executing a mixer-controlling software program. The human operator can also perform operation for recalling the scene data, via a display screen (window) shown on a display of the computer (see, for example, http://www2.yamaha.co.jp/manual/pdf/pa/english/mixers/PM1D ManagerE.pdf).

Heretofore, in order to ascertain the contents (i.e., settings or setting states of the individual parameters) of the selected scene data prior to actual recall of the selected scene data, it has been necessary to show, on a display (e.g., LCD) of the operation panel of the mixer or display of the externally-connected personal computer, a separate screen (window) for visually indicating the contents of the selected scene data.

Generally, settings of individual parameters stored as scene data may undesirably include some kind of data ("attention-requiring data") whose rewriting or change will have great influence on entire mixing processing, such as "patch data" that sets which one of a predetermined plurality of input channels each signal input via any one of a predetermined plurality of input terminals should be assigned to. In order to prevent particular data (e.g., patch data), which had better not be rewritten or changed from the current setting, from being inadvertently changed at the time of recall of corresponding scene data, it is desirable for the human operator to previously ascertain the contents of the scene data to be read out and check to see whether the scene data includes such particular data (hereinafter sometimes called "attention-requiring data" for convenience of explanation), such as patch data, whose change is undesirable and had better be avoided. But, in order to ascertain the contents of selected scene data, a separate screen (window) has to be displayed for that selected scene data, as noted above. Therefore, with the conventionally-known technique, the contents of selected scene data can not be ascertained readily, and the content ascertaining operation tends to be cumbersome. In addition, there has been a great possibility of the human operator erroneously performing the recall operation of the selected scene data without noticing that the selected scene data includes an instruction for changing attention-requiring data, such as patch data.

SUMMARY OF THE INVENTION

In view of the foregoing, it is an object of the present invention to provide a technique which can effectively prevent particular data such as patch data, whose inadvertent change is undesirable, from being erroneously changed at the time of readout of scene data.

In order to accomplish the above-mentioned object, the present invention provides an improved parameter setting apparatus for an audio mixer, which comprises: a storage section that stores a plurality of parameter setting data sets each including, as a set of data, respective settings of a plurality of types of parameters; a selection section that selects a desired one of the plurality of parameter setting data sets stored in the storage section; a control section that determines whether given object-of-caution data is among the plurality of types of parameters included in the selected parameter setting data set, and performs a predetermined cautioning operation if it has been determined that the object-of-caution data is among the plurality of types of parameters; and a setting section that reads out the selected parameter setting data set from the storage section in response to an instruction given by a human operator, and then sets the respective states of the plurality of types of parameters in the audio mixer in accordance with the read-out parameter setting data set.

According to the present invention, once a human operator selects any one of the parameter setting data sets, the control section determines whether given object-of-caution data is among (i.e., included in) the plurality of types of parameters included in the selected parameter setting data set. If it has been determined that the object-of-caution data is among the plurality of types of parameters, the control section performs control to carry out the predetermined cautioning operation. The object-of-caution data is particular data, such as patch data, related to a parameter whose change will have great influence on entire mixing processing. By performing the predetermined cautioning operation (e.g., caution display) in response to the determination that the object-of-caution data is among the plurality of types of parameters, the human operator is allowed to readily and clearly ascertain that the selected parameter setting data set includes the object-of-caution data, such as patch data. Such inventive arrangements can effectively prevent particular data such as patch data, whose inadvertent change is undesirable, from being erroneously changed at the time of readout of scene data.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF EMBODIMENTS

Figure 1:
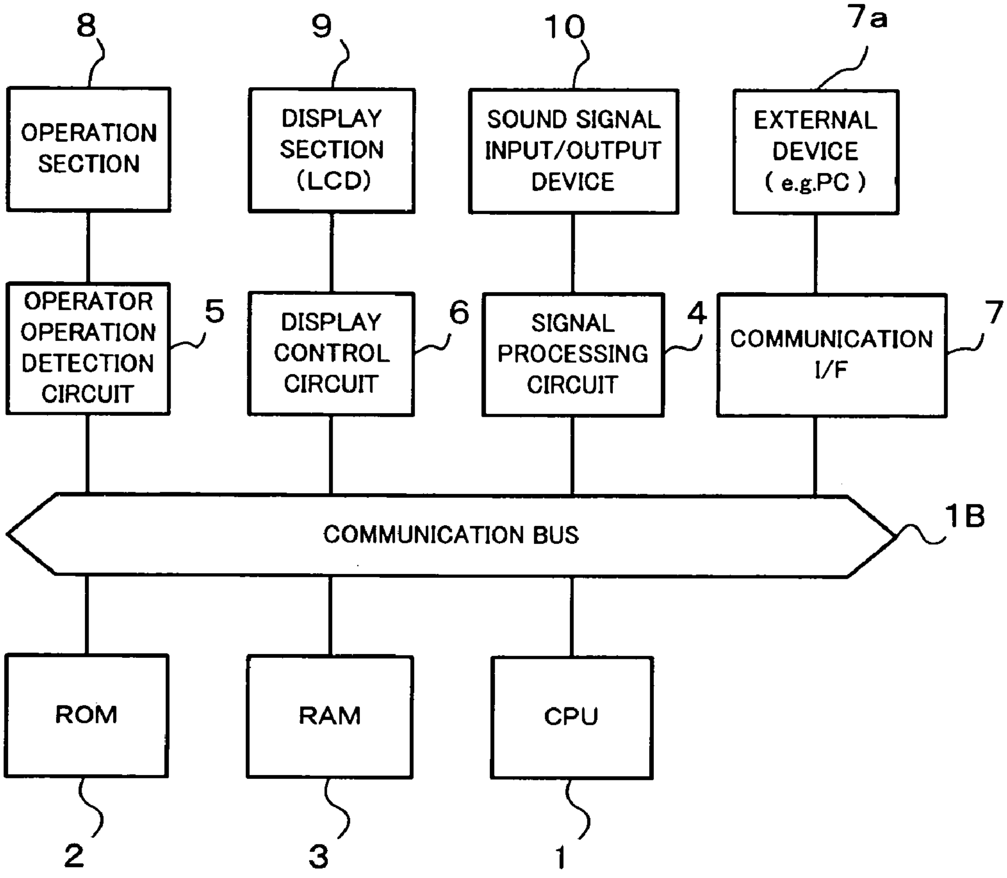
FIG. 1 is a block diagram showing a general hardware setup of an audio mixer in accordance with an embodiment of the present invention.

FIG. 1 is a block diagram showing a general hardware setup of an audio mixer in accordance with an embodiment of the present invention. The audio mixer of FIG. 1 includes a CPU 1, a ROM 2, a RAM 3, a signal processing circuit (DSP) 4, an operator operation detection circuit 5, a display control circuit 6 and a communication interface (I/F) 7, and these various components are interconnected via a communication bus 1B. The mixer is connected with an external device 7*a*, such as a personal computer, via the communication interface 7 so that data can be communicated between the mixer and the external device 7*a*. The external device 7*a* is capable of controlling operation or behavior of the entire mixer and displaying various operating states etc. of the mixer on a display provided in the external device 7*a*, by execution of mixer-controlling software programs.

The CPU 1 executes various control programs stored in the ROM 2 or RAM 3, to thereby control the operation of the entire mixer. The various control programs stored in the ROM 2 or RAM 3 include a program for performing a recall process for recalling scene data (i.e., parameter setting data set) as will be later described in detail. The RAM 3 includes a storage area (scene memory) for storing "scene data" having respective setting states (set values or settings) of a plurality of types of parameters recorded therein, as a set of data, in accordance with an instruction by a human operator, and the scene memory is capable of storing a plurality of such scene data representative of a plurality of scenes. The RAM 3 also includes a storage area (current storage area) for storing respective states or values of all of various parameters currently set in the mixer; that is, the current setting data of the various parameters are stored in the current storage area.

As the various programs to be executed by the CPU 1, there may be used not only the programs stored in the ROM 2 or RAM 3, but also programs stored in a not-shown external storage medium, such as a hard disk or CD-ROM, and programs downloaded from an appropriate server computer via a communication interface and then stored in a not-shown hard disk device (HDD). When any one of the various programs is to be executed, the program is transferred to the RAM 3 and executed under control of the CPU 1, and this approach significantly facilitates version upgrade, addition, etc. of programs.

To the operator operation detection circuit 5 is connected an operation section (mixing console) 8 that includes a group of mixing-related operators, such as tone volume faders and a group of instructing operators for instructing storage, selection, etc. of "scene data" as will be detailed later. Via the operation section 8, the human operator performs mixing operation and instructs setting of various parameters and startup of various functions, etc. Further, a display section 9 connected to the display control circuit 6 displays any of various operating screens (windows) corresponding to various functions of the mixer (i.e., functions corresponding to various mixing operation in the mixer) in accordance with control by the CPU 1. On the various operating screens, there are indicated operating states, parameter setting states, etc. of the mixer. Note that the display section 9, comprising, for example, an LCD (Liquid Crystal Display), is positioned on a panel of the operation section 8.

The signal processing circuit 4 performs signal processing (mixing processing) on digital audio signals, input via a sound signal input/output device 10, on the basis of operation (parameter setting operation), by the human operator, on the operation section 8, and then the processing circuit 4 outputs the processed results to the sound signal input/output device 10 as mixed outputs.

Now, a brief description is made about basic mixing processing performed by the signal processing circuit 4. To the signal processing circuit 4 are supplied a plurality of kinds of input signals (digital audio signals) via a predetermined plurality of input terminals provided in the sound signal input/output device 10. The input signals input via the predetermined plurality of input terminals are assigned to a predetermined plurality of input channels in the signal processing circuit 4. In this specification, thus-assigning the input signals of the input terminals to the input channels is called "patch", and setting data of the patch is called "patch data". Namely, the input signals of the input terminals are assigned to the respective predetermined input channels in accordance with the patch data. As noted earlier, if the set contents of the patch data (i.e., assignment, to the input channels, of the input signals of the input terminals) are changed, the change may greatly influence the entire mixing processing. As will be detailed, when a change is to be made to the parameter settings by recalling selected scene data and if the selected scene data includes some kind of attention-requiring data, such as the patch data, whose change is undesirable and hence requires due previous attention, a predetermined cautioning operation is carried out in the instant embodiment to inform the human operator of the inclusion or presence of the attention-requiring data.

The human operator can operate the various operators on the operation section (console) 8 to cause tone volume control and parameter setting, such as effect setting, to be performed independently or separately on the input signal of each of the input channels, and the signal processing circuit 4 can perform signal processing on the input signals of the individual input channels in accordance with the parameters set via the operation section 8. The signals, having been subjected to the signal processing, are then mixed in accordance with the parameters set via the operation section 8, and the resultant mixed signals are output to the sound signal input/output device 10. The signal processing circuit 4 includes a predetermined plurality of output channels on its output side, and the sound signal input/output device 10 includes a predetermined plurality of output terminals for outputting the mixed signals delivered from the output channels of the signal processing circuit 4. Signal assignment setting (patch setting) is made between the output channels of the signal processing circuit 4 and the output terminals of the input/output device 10 in a similar manner to that made on the input side of the signal processing circuit 4 as noted above.

Figure 2:
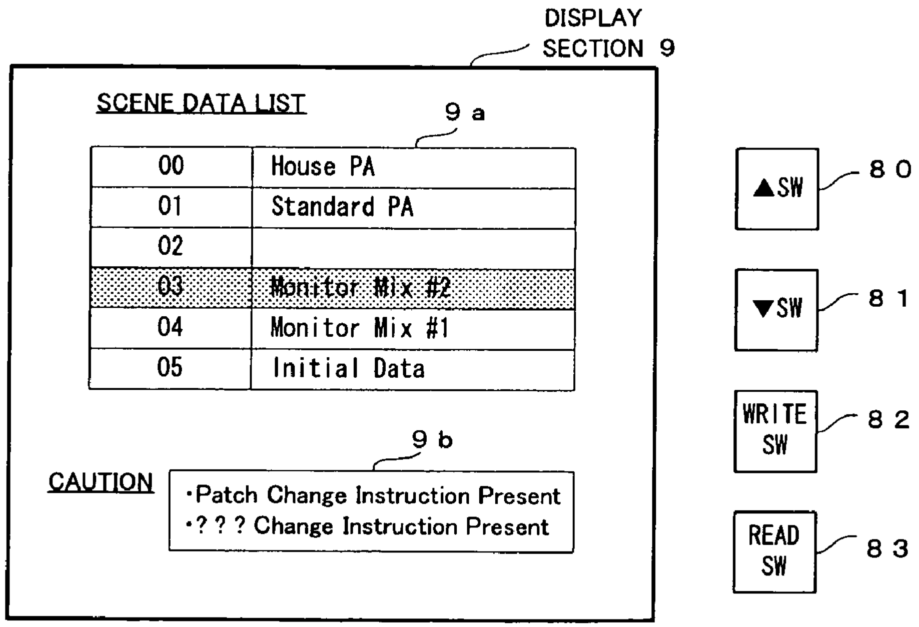
FIG. 2 is a diagram extractively showing a display section provided on an operation section of the audio mixer and a group of operators provided on the operation section for scene data recall operation.

Next, a description will be made about a "scene data" recall function performed in the instant embodiment. FIG. 2 extractively shows the display section 9, and a group of the operators provided on the operation section 8 and operable for writing/reading of scene data. In FIG. 2, reference numerals 80 and 81 represent an increment switch and a decrement switch, respectively, operable to select desired scene data as will be later described. Further, reference numeral 82 represents a write switch ("write SW") for instructing that current settings of predetermined parameters (i.e., some of data stored in the current storage area which pertain to the predetermined parameters to be included in scene data) be stored as single scene data (i.e., single parameter setting data set). Further, reference numeral 83 represents a recall switch ("read SW") for reading out scene data selected by the human operator and rewriting the current settings of the individual parameters in accordance with the contents of the read-out scene data.

Once the human operator instructs startup of a scene data selection process routine via the operation section 8 (e.g., by activating a predetermined operator (not shown) of the operation section 8), a scene data selecting screen (window) is displayed on the display section 9, as seen in FIG. 2. As illustrated, the scene data selecting screen lists a plurality of scene data, i.e. shows a scene data list 9*a*. On the scene data list 9*a* of the scene data selecting screen, there may be listed all of scene data stored in the scene memory of the RAM 3. Each of the scene data is assigned a unique scene number and scene name, and the scene data list 9*a* enumerates the scene numbers and scene name of the individual scene data. In the illustrated example of FIG. 2, numeric characters "00"), "01,", . . . arranged in a vertical row on a left section of the scene data list 9*a* are the scene numbers, and letters "House PA", "Standard PA", . . . arranged in a vertical row to the right of the scene numbers are the scene names. Such a scene number and scene name may be either automatically assigned each time scene data is newly set (stored), or newly created by the human operator.

In the scene data list 9*a*, a shaded portion is a marker indicative of currently-selected scene data; in the illustrated example of FIG. 2, the marker indicates that scene data of scene number "03" and scene name "Monitor Mix #2" has been selected. The currently-selected scene data marker is caused to move vertically in response to operation of the increment switch 80 or decrement switch 81. The human operator can select desired one of the displayed scene data by moving the maker to the position of the desired scene data. Desired one of the displayed scene data may be selected by any other suitable method than the above-mentioned, e.g. by using a not-shown numeric keypad to enter the scene number of the desired scene data and confirming the scene data selection through operation of a not-shown "Enter" key. Once the recall switch 83 is operated with the desired scene data selected (i.e., the scene data selection confirmed), the scene data recall process is carried out as will be later described.

Even when desired scene data (in the illustrated example, scene data No. 3) has been selected from the scene data list 9*a*, the human operator can not ascertain, on the scene data selecting screen, the contents or detailed settings of various parameters included in the selected scene data; that is, to ascertain the contents of the various parameters included in the selected scene data, the human operator has to cause another or separate screen to be displayed. If the selected scene data includes a parameter change instruction for a parameter whose setting change should not be effected inadvertently (i.e., attention-requiring data), such as patch data, the instant embodiment automatically displays a caution display window 9*b*, as illustrated in FIG. 2, in such a manner that the detailed settings of the various parameters in the selected scene data can be ascertained immediately (without the user having to perform any particular operation). In this way, the instant embodiment allows the human operator to readily confirm that the selected scene data includes a change instruction for a parameter, such as patch data, whose setting change should not be effected inadvertently. Namely, according to the instant embodiment, of the various parameter setting data recorded in each scene data, each parameter, such as patch data, whose setting change should not be effected inadvertently (i.e., attention-requiring data) is previously set as object-of-caution data; thus, when any one of the scene data has been selected, any attention-requiring data included in the selected scene data is displayed as "object-of-caution data" on the caution display window 9*b*. On the caution display window 9*b* of FIG. 2, there are indicated caution messages "Patch Change Instruction Present" and "??? Change Instruction Present". The "Patch Change Instruction Present" message indicates that the currently-selected scene data includes a change instruction of patch data, and the "??? Change Instruction Present" message indicates, by "???", the name of a parameter set as object-of-caution data; namely, ??? is shown here for convenience of explanation in place of a specific parameter name. The following paragraphs describe example organizations or formats of the scene data which are intended to achieve such a caution display.

Figure 3A:
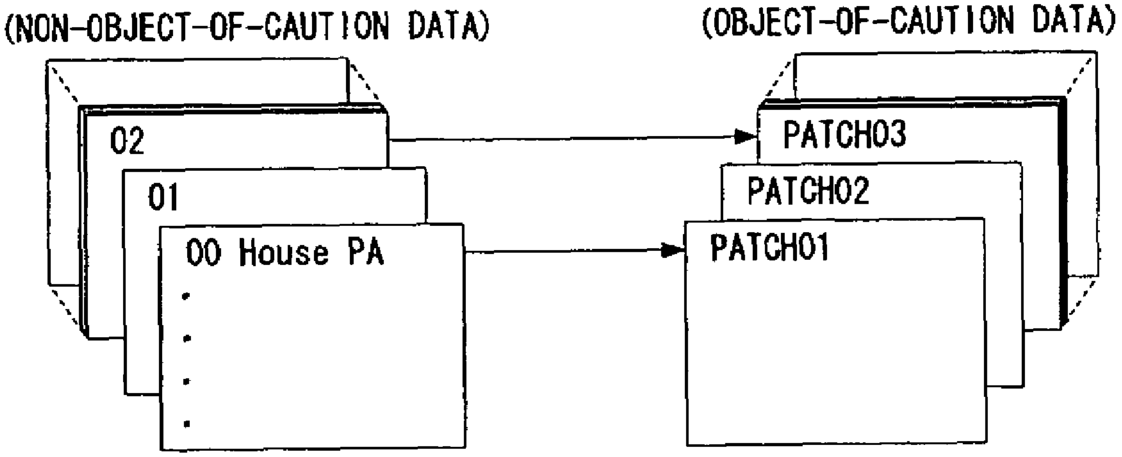
FIGS. 3A and 3B are diagrams showing example organizations of scene data employed in the embodiment of the present invention.
Figure 3B:
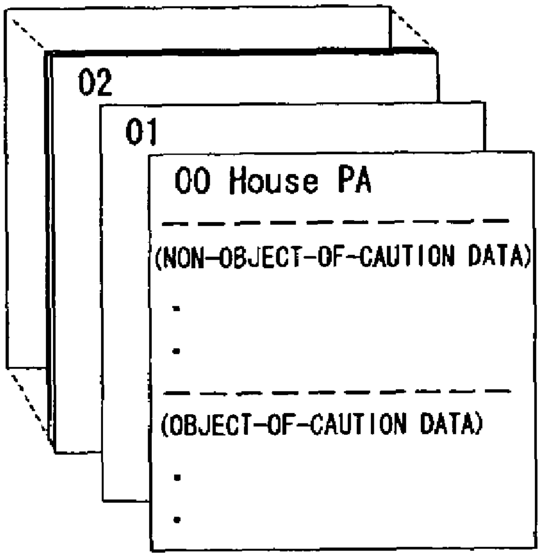

FIG. 3A is a diagram showing an example of a data storage format of the scene data stored in the scene memory area of the RAM 3, in which attention-requiring data (object-of-caution data) are stored separately from the other, i.e. non-attention-requiring data (namely., non-object-of-caution data). As noted above, each scene data, which is assigned a unique scene number and scene name, includes data indicative of settings of tone volume control parameters and effect parameters, panning parameters and other parameters of the individual input channels. The setting of each attention-requiring parameter like patch data, for which it is desirable that the inclusion therein of a change instruction of the parameter setting be informed in advance to the human operator because the change is likely to have great influence on the entire mixing processing, is stored as object-of-caution data separately from the remaining data of the scene data. In the illustrated example of FIG. 3A, a plurality of patch data (PATCH01, 02, 03, . . . ) are stored as object-of-caution data. Each of the object-of-caution data (e.g., patch data) can be associated with the scene data, for example, in such a manner that scene data "00" uses patch data "01", scene data "02" uses patch data "03" and so on.

Whereas FIG. 3A shows the example where the non-object-of-caution data and object-of-caution data are stored separately, the present invention is not so limited. For example, the object-of-caution data may be contained in the scene data. Namely, the scene data may mixedly include, as setting state data of the parameters, non-object-of-caution data and object-of-caution data, such as patch data.

Namely, the instant embodiment may employ any desired scene data format as long as the data format allows the human operator or the like to identify each object-of-caution data from among various data (parameters) to be read out as the scene data.

Types of parameters to be set as the object-of-caution data may be set in advance, or may be set as desired by the human operator. The embodiment may be arranged to display a separate window so that the human operator can set or change, on the separate window, the types of parameters to be set as the object-of-caution data. The types of parameters to be set as the object-of-caution data may be set or changed at any suitable time.

Further, in the instant embodiment, setting can be made to separately inhibit readout of any of the parameters included in the scene data (i.e., readout inhibition can be set separately for any of the parameters in the scene data), and information indicative of the readout inhibition setting is stored in a predetermined storage area provided in the RAM 3. There may be displayed a separate window such that the human operator can set the readout inhibition for any desired parameter on the separate window. The readout inhibition may be set or changed at any suitable time. For example, the human operator may set the readout inhibition for any parameter (e.g., parameter set as an object of caution) after the human operator has selected a desired scene data, but before he or she instructs recall of the selected scene data. If the recall of the selected scene data is carried out after the readout inhibition setting operation, then the scene data can be used, excluding the parameter, such as patch data, that had better not be changed.

Figure 4:
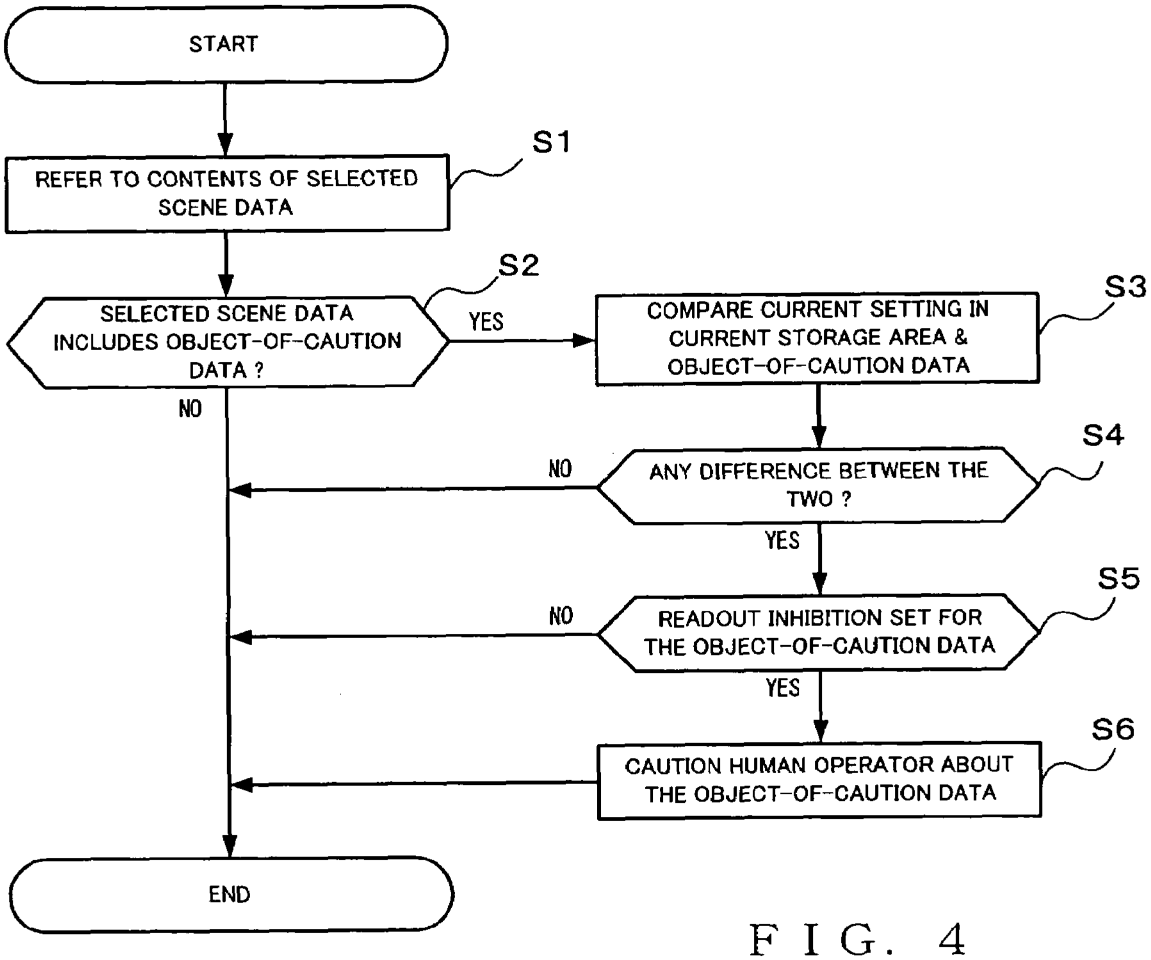
FIG. 4 is a flow chart showing an example step sequence of caution display control that is started up in response to scene data selection in the embodiment of the present invention.

FIG. 4 is a flow chart showing an example step sequence of caution display control that is started up when a scene data has been selected from the scene data list 9*a* on the scene data selecting screen.

The caution display control routine of FIG. 4 is started up when a scene data has been newly selected on the scene data selecting screen through operation of the increment or decrement switch 80 or 81 or through entry of a desired scene number via the numeric keypad and confirmation by the enter key. In response to the selection of the scene data, reference is made to the contents of the selected scene data stored in the scene memory area of the RAM 3 at step S1, on the basis of which it is determined at step S2 whether or not the selected scene data includes any object-of-caution data. In the case where the data format illustrated in FIG. 3A is employed, a determination may be made as to presence/absence of object-of-caution data associated with the selected scene data. If the selected scene data includes object-of-caution data (YES determination at step S2), a comparison is made at step S3 between the setting of the parameter represented by the object-of-caution data of the selected scene data and the current setting of the corresponding parameter stored in the current storage area of the RAM 3, to thereby determine, at step S4, whether there is any difference between the setting of the parameter represented by the object-of-caution data and the current setting of the corresponding parameter stored in the current storage area. If there is no difference between the two (NO determination at step S4), the instant caution display control routine is brought to an end without performing any further operation. Thus, even when the selected scene data includes object-of-caution data, a change to the parameter will not have any substantial influence on the mixing processing and therefore may be safely canceled from the setting or status as the object of caution, on condition that there is no difference, from the current setting, of the setting of the parameter represented by the object-of-caution data (i.e., if the settings of the two have been determined, through the comparison, as agreeing with each other).

At step S5, a determination is made as to whether the object-of-caution data in the scene data is readout-inhibited data (i.e., readout inhibition is currently set for that object-of-caution data). With a NO determination at step S5, the instant caution display control routine is brought to an end. If, on the other hand, the object-of-caution data is readout-inhibited data (YES determination at step S5), then the object-of-caution data may be safely canceled from the setting or status as the object of caution because the parameter setting of the data is not read out. Then, at step S6, the human operator is cautioned about the object-of-caution data that meets the determination conditions of steps S4 and S5. In the instant embodiment, the caution display window 9B is displayed on the scene data selecting screen of FIG. 2 to thereby issue the caution to the human operator. The caution display window 9*b* shows the object-of-caution data included in the selected scene data. Thus, the human operator is allowed to readily ascertain whether the selected scene data includes any instruction for changing a parameter whose change from the current setting is undesirable. If the selected scene data includes two or more object-of-caution data (parameters), the ascertaining operations of steps S3-S5 are performed for each of the two or more object-of-caution data. In such a case, a separate caution may be issued for each one of the object-of-caution data, or only one caution may be issued for all of the object-of-caution data.

On the caution display screen 9*b*, the human operator can ascertain whether the selected scene data includes any instruction for changing a parameter whose setting change is undesirable, and then perform operation for recalling the selected scene data. Once the human operator operates the readout switch 83 of FIG. 2, data of settings (i.e., set values) of the individual parameters recorded in the selected scene data are read out from the scene memory area of the RAM 3, and then the thus read-out parameter settings are set in the signal processing circuit 4 (see FIG. 1). For the parameter set as the readout-inhibited data, the setting data thereof is inhibited from being read out, and the current setting of the parameter is maintained. In case the human operator also instructs recall of a parameter set as the object of caution, the setting of that parameter too is read out and set in the signal processing circuit 4. In this manner, the current settings of the mixer can be collectively rewritten on the basis of the recorded contents (i.e., settings of the individual parameters) the selected scene data, so that the settings of the various parameters recorded in the selected scene data can be reproduced.

Namely, the instant embodiment is arranged in such a manner that, when the selected scene data to be read out includes any parameter, such as patch data, whose setting change is undesirable, the caution display is made to allow the human operator to ascertain presence of the object-of-caution data, such as patch data. As a consequence, the instant embodiment can effectively prevent the setting of any parameter, whose setting change is undesirable, from being erroneously changed.

Whereas the embodiment has been described in relation to the case where the object-of-caution data or parameter is patch data, any other parameter whose setting change is likely to have great influence on the entire mixing processing may be set as the object-of-caution data. Also, even a parameter whose setting change is not likely to have great influence on the entire mixing processing may be set as the object-of-caution data as desired by the human operator.

The way of cautioning about object-of-caution data in response to selection of scene data is not limited to the one by the visual display (i.e., caution display window 9*b*) as shown in FIG. 2; the caution may be made by displaying a popup screen from the displayed position of the selected scene data on the scene data list 9*a*, or by changing the color of the entire display section (e.g., LCD) 9, or by changing the color of the displayed area or scene number of the selected scene data on the scene data list 9*a*, or by blinking the displayed area or scene number of the selected scene data, as long as the visual caution allows the human operator to readily know that the selected scene data includes object-of-caution data. Further, the caution may be by other than the visual caution display, such as an auditory caution by generation of a suitable cautioning sound or one based on any other suitable scheme, as long as the caution can be readily identified by the human operator.

It should be appreciated that the parameter setting processing of the present invention is not limited to the above-described embodiments where the execution of the processing is controlled in the mixer apparatus. For example, the parameter setting processing in the mixer apparatus may be controlled by the external device 7*a*, such as a personal computer externally connected to the mixer apparatus, starting up a parameter-setting-processing executing software program to display a scene data selecting screen, as shown in FIG. 2, on a display provided in the external device 7*a* so that the human operator can enter various instructions via a GUI on the display of the external device 7*a*.

What is claimed is:

1. A parameter setting apparatus for an audio mixer comprising:

a storage section that stores a plurality of parameter setting data sets each including, as a set of data, data indicative of respective settings of a plurality of types of parameters, wherein part of the data included in at least one of set of said plurality of parameter setting data sets is a type of parameter, wherein said type of parameter is predefined as object-of-caution data;

a selection section that selects a desired one of the plurality of parameter setting data sets stored in said storage section;

a control section that determines whether said part of the data predefined as the object-of-caution data is included in the parameter setting data set selected via said selection section, and performs a predetermined cautioning operation if it has been determined that said part of the data predefined as the object-of-caution data is included in the selected parameter setting data set; and a setting section that reads out the selected parameter setting data set from said storage section in response to an instruction given by a human operator, and sets respective states of the plurality of types of parameters in said audio mixer in accordance with the read-out parameter setting data set.

2. A parameter setting apparatus as claimed in claim 1 which further comprises an inhibition setting section capable of setting readout inhibition individually for each of the plurality of types of parameters, and wherein said control section determines whether the readout inhibition is currently set, by said inhibition setting section, for the type of parameter corresponding to said part of the data predefined as the object-of-caution data included in the selected parameter setting data set and performs the predetermined cautioning operation on condition that the readout inhibition is not currently set, by said inhibition setting section, for the type of parameter corresponding to said part of the data predefined as the object-of-caution data included in the selected parameter setting data set.

3. A parameter setting apparatus as claimed in claim 1 wherein said predetermined cautioning operation performed by said control section includes making a visual caution display on a display device.

4. A parameter setting apparatus as claimed in claim 1 wherein said predetermined cautioning operation performed by said control section includes generating an auditory caution sound.

5. A computer-readable storage medium containing a group of computer-executable instructions which, when executed by a computer, cause the computer, used for an audio mixer, to perform parameter setting processing, said computer having attached thereto a storage section that stores a plurality of parameter setting data sets each including, as a set of data, data indicative of respective settings of a plurality of types of parameters, wherein part of the data included in at least one set of said plurality of parameter setting data sets is a type of parameter, wherein said type of parameter is predefined as object-of-caution data, said parameter setting processing comprising:

a step of selecting a desired one of the plurality of parameter setting data sets stored in said storage section;

a step of determining whether said part of the data predefined as the object-of-caution data is included in the parameter setting data set selected via said step of selecting, and performing a predetermined cautioning operation if it has been determined that said part of the data predefined as the object-of-caution data is included in the selected parameter setting data set; and a step of reading out the selected parameter setting data set from said storage section in response to an instruction given by a human operator, and setting respective states of the plurality of types of parameters in said audio mixer in accordance with the read-out parameter setting data set.

6. A parameter setting apparatus as claimed in claim 1 wherein said control section determines whether said part of the data predefined as the object-of-caution data is included in the parameter setting data set selected via said selection section before said setting section sets the respective states of the plurality of types of parameters in said audio mixer in accordance with the read-out parameter setting data set.

7. A parameter setting apparatus as claimed in claim 1 wherein said predetermined cautioning operation comprises a caution that indicates a difference between the setting of a parameter represented by the object-of-caution data and the current setting of the corresponding parameter of the audio mixer, wherein said caution also indicates that readout inhibition is currently set for the object-of-caution data.

8. A computer-readable storage medium as claimed in claim 5 wherein said group of computer-executable instructions which, when executed by a computer, cause the computer to determine whether said part of the data predefined as the object-of-caution data is included in the parameter setting data set selected via said selection section before setting the respective states of the plurality of types of parameters in said audio mixer in accordance with the read-out parameter setting data set.

9. A computer-readable storage medium as claimed in claim 5 wherein said predetermined cautioning operation comprises a caution that indicates a difference between the setting of a parameter represented by the object-of-caution data and the current setting of the corresponding parameter of the audio mixer, wherein said caution also indicates that readout inhibition is currently set for the object-of-caution data.

* * * * *